United States Patent [19]
Itoh et al.

[11] Patent Number: 5,184,848
[45] Date of Patent: Feb. 9, 1993

[54] HOLOGRAM CALENDAR

[75] Inventors: Masakazu Itoh; Satoshi Yamazaki, both of Tokyo, Japan

[73] Assignee: Dai Nippon Insatsu Kabushiki Kaisha, Tokyo, Japan

[21] Appl. No.: 678,329

[22] PCT Filed: Aug. 30, 1990

[86] PCT No.: PCT/JP90/01101
§ 371 Date: Jun. 13, 1991
§ 102(e) Date: Jun. 13, 1991

[87] PCT Pub. No.: WO91/03380
PCT Pub. Date: Mar. 21, 1991

[30] Foreign Application Priority Data
Aug. 31, 1989 [JP] Japan .................................. 1-101861

[51] Int. Cl.5 ............................................. B42D 15/00
[52] U.S. Cl. ........................................ 283/2; 283/81; 283/86
[58] Field of Search .................... 283/2, 81, 86, 117

[56] References Cited
U.S. PATENT DOCUMENTS 3,316,709 5/1967 Edwards ........................ 253/117 X
3,455,043 7/1969 Augustine .
3,552,853 1/1971 Sanders et al. ................... 253/86 X
5,085,514 2/1992 Mallik et al. ..................... 253/86 X

FOREIGN PATENT DOCUMENTS 19789     8/1987 Japan .................................. 283/81
62-123972 8/1987 Japan .................................. 283/81
62-138050 8/1987 Japan .................................. 283/81
143580    8/1987 Japan .................................. 283/81

Primary Examiner—Paul A. Bell
Attorney, Agent, or Firm—Wegner, Cantor, Mueller & Player

[57] ABSTRACT

This invention relates to a transparent hologram calendar (1) to be bonded onto the surface of an article and peeled after a passage of a predetermined period, comprising a transparent or translucent hologram formation layer (11) formed by recording calendar information as a hologram image (1a) capable of reproducing a visible image by white light and a tackifier layer (15) formed on one of the surfaces of the hologram formation layer (11) and having both bonding characteristics sufficient to bond the calendar to the surface of the article and re-peel characteristics sufficient to peel the calendar easily after the passage of a predetermined period.

10 Claims, 2 Drawing Sheets

HOLOGRAM CALENDAR

TECHNICAL FIELD

This invention relates to a hologram calendar utilizing a transparent hologram and more particularly, to a hologram calendar which can be used suitably for a wrist watch calendar, or the like.

BACKGROUND ART

Conventional calendars for a wrist watch use mostly a metal such as aluminum and are equipped with a thin flat sheet portion and lock portions on both sides of the flat sheet portion, and the calendar is printed by ordinary methods on the surface of the flat sheet portion.

The calendar for the timepiece is fitted to a timepiece band by bending inward the lock portions on both sides to the timepiece band.

However, since the conventional calendar for the timepiece is fitted by bending the lock portions to the band of the wrist watch, it cannot be fixed reliably unless the timepiece band is flat sheet-like and has a predetermined width. For example, the calendar cannot be fitted easily to the timepiece band such as a chain band and a decorative band.

Recently, not only a clock function but also a decorative function have been required for wrist watches and many watches have an excellent design. Therefore, the calendar for a wrist watch produced by merely printing the calendar onto a metal sheet by an ordinary printing method involves the problem that when fitted to the wrist watch, the calendar spoils the overall decoration effect of the wrist watch.

If the timepiece band is a leather band or if it is of a decorative type, the calendar for the wrist watch made of a metal deteriorates appearance and moreover, damages the band.

It is an object of the present invention to provide a hologram calendar which solves the problems described above, can be fitted easily and be removed easily after the passage of a predetermined period, does not attract the attention of its fitting and also does not spoil the original function of an article to which it is fitted.

DISCLOSURE OF THE INVENTION

The hologram calendar for accomplishing the objects described above is a calendar which is bonded to the surface of an article and can be peeled after the passage of a predetermined period. The hologram calendar of the present invention comprises a transparent or translucent hologram formation layer formed by recording calendar information as a hologram capable of reproduction by white light or as an image visible by reflected diffraction light, and a tackifier layer formed on one of the surfaces of the hologram formation layer and having both bonding characteristics sufficient to bond the calendar to the article and re-peel characteristics sufficient to peel it easily from the article after the passage of a predetermined period from bonding.

In a preferred embodiment of the present invention, the bonding power of the tackifier layer described above is controlled to the range of from 200 to 1,300 g/25 mm and its tack is controlled to 10 or below. In this manner, sufficient bonding, power of the calendar onto the article surface as well as re-peel characteristics can be satisfied.

BRIEF DESCRIPTION OF DRAWINGS

FIGS. 1 and 2 are drawings that show an embodiment of a hologram calendar in accordance with the present invention, wherein FIG. 1 is a plan view and FIG. 2 is an enlarged sectional view in a direction of thickness.

BEST MODE FOR CARRYING OUT THE INVENTION

Hereinafter, preferred embodiments of the present invention will be described in further detail with reference to the accompanying drawings.

Figure 1:
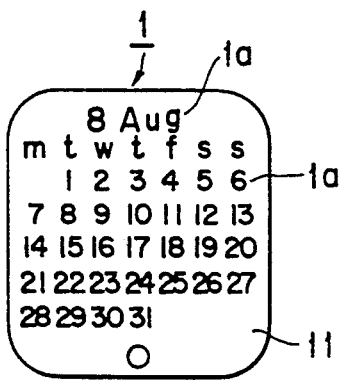
Figure 2:
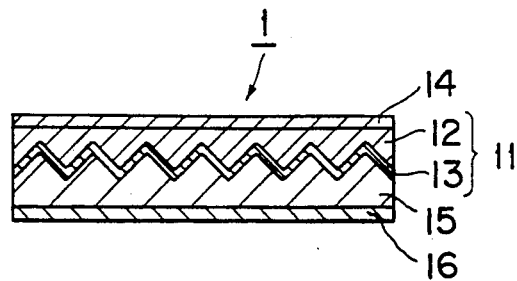

FIGS. 1 and 2 show an embodiment of a hologram calendar in accordance with the present invention, wherein FIG. 1 is a plan view and FIG. 2 is an enlarged schematic view in a direction of thickness.

The hologram calendar 1 of this embodiment comprises a hologram formation layer 11 which records a calendar as a hologram image 1a, a surface protection film 14 which is formed on the hologram formation layer 11, a tackifier layer 15 which is formed under the hologram formation layer 11 and a nonsticking paper 16 bonded to the lower side of the tackifier layer 15.

The hologram formation layer 11 records a pattern of a calendar of one month as a hologram image 1a that can be reproduced by white light by a relief hologram system, for example, and its imaging methods include image hologram, rainbow hologram, holographic grating which is formed partially, and so forth.

The hologram image need not always be recorded by the holographic methods and those having a partially formed relief-like diffraction grating obtained by mechanical recording or by photolithographic recording using a certain kind of photosensitive material can also be employed. The products which are obtained by embossing and duplicating the relief shape of these recorded articles can be used as ordinary products. The term "hologram image" as used herein embraces those diffraction patterns which are formed by diffraction grating such as described above.

The hologram formation layer 11 consists of a hologram resin layer 12 having a relief surface of the hologram image 1a formed on its lower surface and a transparent or translucent effect layer 13 which is formed on the relief surface of the hologram resin layer 12 and improves the hologram effect. The hologram formation layer 11 is either transparent or translucent as a whole.

Thermoplastic resins, thermo-setting resins or their mixtures can be used as the material of the hologram resin layer 12. Those formation materials which have a radical-polymerizable unsaturated group and are set by heat, light and other radiation beams can be employed, as well. This hologram resin layer 12 is formed on the surface protection film 14 by a coating system, or the like. If the surface protection film can be shaped by embossing, however, the hologram image may be formed on the film itself by relief hologram or the like. In this case, the hologram resin layer is not necessary.

The effect layer 13 must be transparent because it is used as a transparent hologram and its examples include a transparent material having a different refractive index from that of the hologram resin layer 12, and thin metal film layers which are up to 200 Å thick.

In the case of the former, the refractive index of the effect layer 13 may be greater or smaller than that of the hologram resin layer 12 but the difference of refractive indices is preferably at least 0.1, more preferably at least 0.5 and most preferably at least 1.0.

In the case of the latter, the transmissivity of the optical wave is great although the effect layer 13 is the thin metal film because it is as thin as less than 200 Å. Accordingly, the layer 13 exhibits the function of the hologram effect as well as the non-concealing function of a display portion, for example, below it.

Examples of the materials for the effect layer 13 are, for example, $Sb_2S_3$ (refractive index 3.0) or $ZnS$ (2.1) as a transparent continuous thin film having a greater refractive index than that of the resin layer 12. Thin film formation methods such as vacuum deposition, sputtering, and the like, can be employed for forming the effect layer 13 on the hologram resin layer 12.

The material and formation method of the hologram formation layer are described in detail in U.S. Pat. Ser. No. 4,856,857 granted to the Applicant of the present invention.

The surface protection film 14 is disposed in order to protect the hologram formation layer 11 from the damage by any external force and to provide it with strength as a label. It is possible to use cellulose resins, acrylic resins, vinyl resins, polyamide resins, polyimide resins, polystyrene resins, polyester resins and polyolefin resins in the forms of single substances, mixtures and copolymers as the material of this surface protection film 14. The surface protection film 14 is preferably from about 5 to about 200 μm thick.

In some cases the surface protection film serves also as the hologram resin layer as described above. (See later-appearing FIG. 7.)

The tackifier layer 15 is used for bonding the hologram calendar 1 to a transparent protection plate (cover glass) of the timepiece, or the like, and a re-peelable type is used so that it can be replaced every month. In this embodiment, a suitable tackifier is selected from ordinary acrylic and rubber type tackifiers.

It is very important in the present invention to form the tackifier layer which has both the sufficient bonding characteristics capable of bonding the calendar onto the surface of the article such as the timepiece cover glass and the re-peelability characteristics capable of being peeled off readily after the passage of a predetermined period of time from bonding. To accomplish this object, it is important to control both the bonding power and tack of the tackifier layer to a specific range.

In a preferred embodiment of the present invention the bonding power of the tackifier layer is controlled preferably to be within the range of 200 to 1,300 g/25 mm and the tack is controlled to be up to 10. In a more preferred embodiment of the invention the bonding power of the tackifier layer is controlled preferably to the range of 300 to 1,000 g/25 mm with the tack being up to 7 and most preferably, the bonding power is controlled to the range of 400 to 800 g/25 mm with the tack being up to 4.

If the bonding power is less than 200 g/25 mm, sufficient bonding power for bonding to use the calendar cannot be obtained and a sufficient bonding power (at the time of non-use) to the nonsticking paper cannot be obtained, either. If the bonding power exceeds 1,300 g/25 mm, on the other hand, peel of the calendar after a predetermined period of time will become very difficult or even if it can be peeled, it is peeled between the tackifier layer and the hologram formation layer and therefore contaminates the surface of the article.

On the other hand, the tack value is closely associated with contamination with the tackifier layer at the time of bonding of the calendar together with the bonding characteristics. In other words, when the calendar is bonded, the calendar is peeled from the nonsticking paper and is then bonded to the surface of the timepiece cover glass, for example. At this time the finger tip comes unavoidably into contact with the tackifier layer of the calendar and leaves the finger print on the surface of the tackifier layer. The studies conducted by the present inventor reveal that the finger print is likely to be left on the tackifier layer at the time of bonding in the case where the tack value exceeds 10. Contamination of the surface of the tackifier layer is a critical problem for a transparent hologram calendar such as the hologram calendar of the present invention.

The value measured in accordance with a bonding performance test method stipulated in JIS-Z0237 is used as the reference of the bonding power value described above. More definitely, a 25 mm-width testpiece is reciprocated once at a rate of 300 mm/min and bonded onto a SUS304 steel sheet (polished by No. 289 waterproofing polishing paper) by a 2 Kg rubber roller and 20 minutes later, it is peeled in a direction of 180° at a rate of 300 mm/min to measure peel strength. This peel strength is used as the bonding power.

On the other hand, the term "tack" represents the degree of the bonding power that can be obtained simultaneously as bonding of the tackifier to the article to be bonded and more definitely, the value measured in accordance with the ball tack method stipulated in JISZ0237 is used as the reference. In other words, a testpiece is set with its bond surface facing upward onto a glass sheet inclined at 30° under a standard state and a 25 μm-thick polyester film is bonded as an approach. A tacky surface within the range of 100 mm from the lower end of this approach is used as a measuring portion. A ball (steel ball) is rolled from a position at which the approach becomes 100 mm in length and the maximum diameter of the ball stopping on the tacky surface of the measuring portion is used as the tack value.

The nonsticking paper 16 protects the tackifier layer 15 before use and is peeled from the tackifier layer 15 when in use. The tackifier sheet 16 may be those which are prepared by coating a silicone resin, wax, paraffin, or the like, onto a substrate such as paper or a film.

Figure 3:
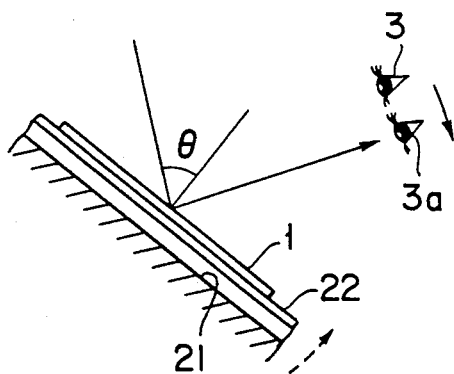
FIGS. 3 to 5 are drawings which will be useful for explaining the mode of use of the hologram calendar in accordance with the present invention.
Figure 4:
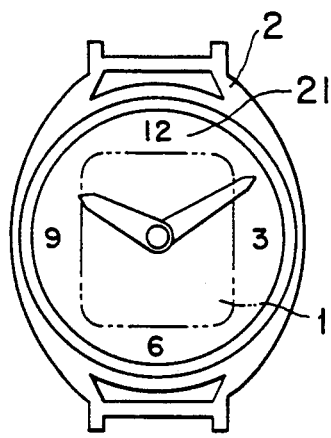
Figure 5:
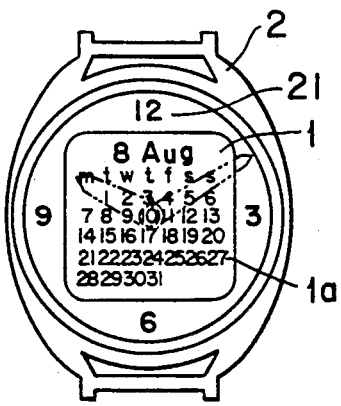

FIGS. 3 to 5 are drawings which will be useful for explaining the mode of use of the hologram calendar of the embodiment of the present invention.

First of all, the nonsticking paper 16 is peeled from the hologram calendar 1 and is bonded onto the transparent protection plate 22 of the wrist watch 2 such as a glass sheet or an acrylic sheet.

Here, a solar light or an indoor light as a reproduction beam is incident from above on the front side. Therefore, a reference beam is irradiated at an angle of 45° with respect to a hologram dry plate at the time of recording of the hologram image 1a on the assumption that the dial of the wrist watch is viewed substantially at an angle of 45°. Accordingly, the field of view of this hologram calendar 1 or in other words, the range in which eyes 3 can be positioned for viewing the hologram image 1a is limited to a relatively narrow range with respect to the hologram calendar 1.

It will be assumed hereby that one views the wrist watch 2 to know the time as shown in FIG. 3. Generally, one seldom bends his arm to the angle of the correct field of view. Therefore, his eyes 3 do not fall within the field of view of the hologram image 1a and he can view the dial 21 of the wrist watch 2 past through the transparent hologram formation layer 11 without viewing the hologram image 1a reproducing the calendar (FIG. 4).

If he wants to know the day of the week or the date by the calendar from this state, he searches for the angle of incidence of the diffraction beam from the calendar 1 into this eyes 3 by changing the positions of the eyes 3a or the angle $\theta$ of the wrist watch 2 and can thus view the reproduced hologram image 1a (FIG. 5).

When the month changes, the hologram calendar 1 can be changed easily because the tackifier layer 15 is repeelable as described already and its peel can be made extremely clearly and readily.

Figure 6:
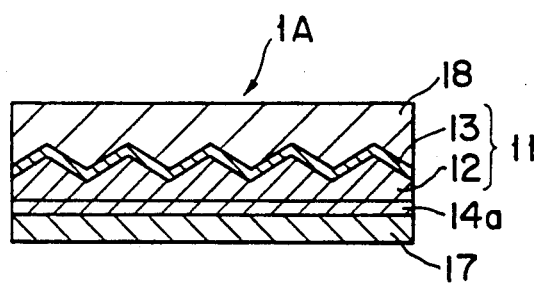
FIGS. 6 to 9 are sectional views and show another embodiment of the hologram calendar of the present invention when it is magnified in the direction of thickness.

FIG. 6 is an enlarged schematic view and shows another embodiment of the hologram calendar in accordance with the present invention in the direction of its thickness.

Like reference numerals are used in this drawing to identify like constituents described above.

The hologram calendar 1A in this embodiment can be constituted as a transfer type or as a bonding type. The transfer type is the one that transfers the calendar by pressing or heating by rubbing the transparent protection plate 22 by a finger, or the like. The bonding type calendar is the one that is bonded merely onto the surface of an article such as bonding of a seal. The bonding type is simpler and more practical.

The hologram calendar 1A is produced by laminating sequentially the surface protection layer 14a, the hologram formation layer 11 consisting of the hologram resin layer 12 and the effect layer 13 and the tackifier layer 18 onto the base film 17 in this order. The surface protection layer 14a plays the function of the peeling layer with respect to the base film 17.

Materials of the base film 17 are polymer films such as polyethylene terephthalate, polyimide, methyl polymethacrylate, polystyrene, polyvinyl butyral, polycarbonate, etc, synthetic paper, metal films such as iron, and their laminate members.

Adhesives such as acrylic resins, vinyl resins, polyester resins, urethane resins, amide resins, epoxy resins, rubber resins, ionomer resins, and the like can be used as the material of the tackifier layer 18. The thickness of the tackifier layer 18 is from about 0.1 to about 50 $\mu$m and preferably from about 1 to about 10 $\mu$m.

This transfer type hologram calendar 1A can be bonded quickly and easily onto the transparent protection plate 22 through the tackifier 18 by superposing the tackifier layer 18 with the transparent protection plate (cover glass) 22 of the wrist watch 2, followed then by peel of the base film 17 from the surface protection layer 14a.

Figure 7:
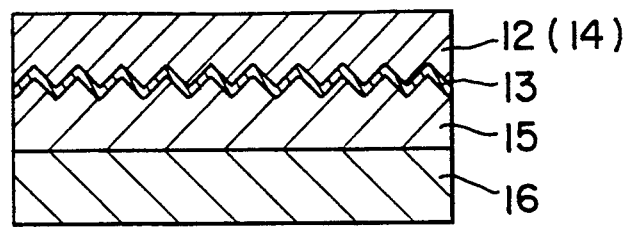
Figure 8:
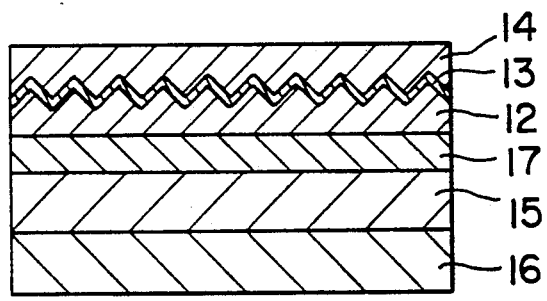
Figure 9:
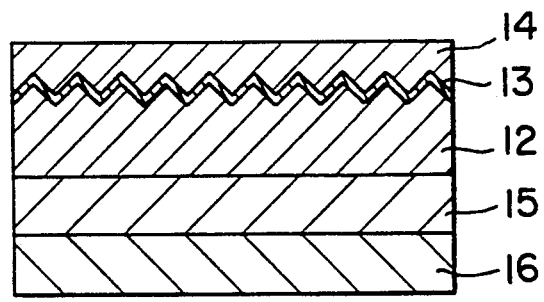

Next, another embodiment wherein the hologram calendar is formed on the nonsticking paper through the tackifier layer will be explained. FIGS. 7 to 9 are sectional views showing the embodiments wherein the hologram calendar is formed on the nonsticking paper through the tackifier layer. FIG. 7 shows the case where the hologram effect layer 13 and the hologram resin layer 12 are formed in this order on the nonsticking paper 16 through the tackifier layer 15. The hologram resin layer 12 in this case is equipped also with the function of the protection layer.

FIG. 18 shows the embodiment wherein the substrate 17, the hologram resin layer 12, the hologram effect layer 13 and the protection layer 14 are formed on the nonsticking paper 16 through the tackifier layer 15.

FIG. 9 shows the embodiment wherein the hologram resin layer 12, the hologram effect layer 13 and the protection layer 14 are formed on the nonsticking paper 16 through the tackifier layer 15.

In the embodiments described above, the protection layer 14 can be formed by coating or lamination. More definitely, it can be formed by gravure coating, roll coating, knife coating or offset printing (lithography) and silk screen printing. Resins such as of acrylic type, vinyl type, urethane type and polyester type or those resins which can be cured by actinic rays such as U.V. can be used as the material for forming such a protection layer. A transparent material is used as the material of the protection layer but colored materials which absorb a wavelength of a part of a wavelength band can also be used. The lamination materials other than for the protection layer may be the same as those described above.

The present invention is not particularly limited to the embodiments described above but can be changed or modified in various ways.

The hologram calendar of the present invention has thus been explained about the case where it is used while fitted to the transparent protection plate of the wrist watch by way of example. However, it can be used suitably for various other applications where the calendar can be confirmed only at a specific angle but cannot be noticed at other angles and permits the content to be seen through, such as the case where it is bonded to a display of a computer for processing data associated with date or is used for the confirmation of the date of a receipt while fitted to a showcase made of glass.

The hologram formation layer 11 may be composed of the hologram resin layer 12 alone without the effect layer 13. For example, the effect layer 13 becomes unnecessary if a Lippmann hologram is used for recording of the diffraction pattern.

Furthermore, the hologram formation layer, the adhesive layer, the tackifier layer, the surface protection layer, and the like, may contain pigments and dyes and may also be colored.

As described above, the present invention records the calendar by utilizing the resulting recording member generating reflected diffraction beams, or in other words, the transparent hologram, and fits it by the tackifier layer. Accordingly, it can be fitted easily and reliably to the wrist watch, and the like.

The calendar is transparent as a whole other than when it is used (or it is viewed); hence, it does not deteriorate the design of the wrist watch or the like and the original function of the article to which it is bonded.

When bonded to the transparent protection plate of the wrist watch, the calendar provides the effect of preventing damage of the surface.

PRODUCTION EXAMPLE 1

Zinc sulfide was vacuum deposited to a thickness of 350 Å as a hologram effect layer onto the emboss surface (relief surface) of an emboss hologram sheet to produce a reflection type transparent hologram.

A tackifier coating solution having the composition shown below was coated to a thickness of 20 μm after drying onto the hologram effect layer of the reflection type transparent hologram described above and then a mold releasing film (nonsticking film) was laminated to produce a tacky sheet.

| (Composition) | |
|---|---|
| KP-1041 (Acrylic tackifier, a product of Nippon Carbide Co.) | 100 parts |
| CK-102 (curing agent, a product of the same company) | 1 part |
| MEK (methyl ethyl ketone) | 30 parts |
| ethyl acetate | 15 parts |
| toluene | 15 parts |

This tacky sheet scored a tack value 3 at a bonding power of 500 g/25 mm with glass and when bonded to glass, it adhered sufficiently without peeling when it was merely wiped. When it WAS peeled a month later, the sheet could be peeled off cleanly and easily from the glass surface. The finger print or the like was not left on the adhesive surface of the tacky sheet when it was touched by a finger; hence, it had excellent handability.

PRODUCTION EXAMPLE 2

A tacky sheet was produced in the same way as in Production Example 1 using a tackifier coating solution having the following composition.

| (Composition) | |
|---|---|
| KP-1041 (acrylic tackifier, a product of Nippon Carbide Co.) | 100 parts |
| CK-102 (curing agent, a product of the same company) | 2 parts |
| MEK (methyl ethyl ketone) | 30 parts |
| ethyl acetate | 15 parts |
| toluene | 15 parts |

This tacky sheet scored a tack value 15 at a bonding power of 1,500 g/25 mm with glass and adhered strongly to glass. When the tacky sheet was peeled a month later, peel between the layers occurred and the tackifier was left locally on the glass surface. When this tacky sheet was touched, traces such as the finger print were left on the tacky surface and it was difficult to bond it clearly.

PRODUCTION EXAMPLE 3

A tacky sheet was produced in the same way as in Production Example 1 using a tackifier coating solution having the following composition.

| (Composition) | |
|---|---|
| KP-1073 | 100 parts |
| CK-102 | 1 part |
| MEK (methyl ethyl ketone) | 30 parts |
| ethyl acetate | 15 parts |
| toluene | 15 parts |

This tackifier scored a tack value 12 at a bonding power of 180 g/25 mm with glass. When the tacky sheet was bonded to glass and was peeled a month later, the tackifier was left locally on the glass surface, though peel was possible. The finger print was left on the tacky surface when the tacky surface was touched before bonding and handling of the sheet was difficult to bond it cleanly.

INDUSTRIAL APPLICABILITY

The present invention can be utilized as a calendar which is used while being bonded onto an article and particularly, as a hologram calendar to be bonded to cover glass of a wrist watch.

We claim:

1. A transparent hologram calendar to be bonded onto the surface of an article and peeled after the passage of a predetermined period, comprising:

a transparent or translucent hologram formation layer formed by recording calendar information as a hologram image capable of reproducing a visible image by white light or reflected diffraction light; and a tackifier layer formed on one of the surfaces of said hologram formation layer and having both bonding characteristics sufficient to bond said calendar onto the surface of said article and re-peel characteristics sufficient to peel said calendar easily therefrom after the passage of a predetermined period from bonding, wherein the bonding power of said tackifier layer is in the range of from 200 to 1,300 g/25 mm and its tack is 10 or below so as to provide both bonding power sufficient to bond said calendar onto said article surface and re-peel characteristics sufficient to peel said calendar easily from said article surface after the passage of a predetermined period.

2. A hologram calendar according to claim 1, wherein said hologram formation layer is a laminate member comprising a hologram resin layer, a hologram effect layer and a surface protection film in this order.

3. A hologram calendar according to claim 2, wherein a substrate, a hologram resin layer, said hologram effect layer and said protection layer are formed sequentially in the order named on a non-sticking paper through said tackifier layer.

4. A hologram calendar according to claim 2, wherein said hologram resin layer, said hologram effect layer and said protection layer are formed sequentially in the order named on a nonsticking paper through said tackifier layer.

5. A hologram calendar according to claim 1, wherein said hologram calendar is under the state where it is bonded onto a nonsticking paper through the tackifier layer.

6. A hologram calendar according to claim 5, wherein a hologram effect layer and a hologram resin layer are formed sequentially in the order named on said nonsticking paper through said tackifier layer.

7. A hologram calendar according to claim 1, which is used for bonding to a cover glass of a wrist watch.

8. A hologram calendar according to claim 1, wherein the bonding power of said tackifier layer is in the range of from 300 to 1,000 g/25 mm and its tack is 7 or below.

9. A hologram calendar according to claim 1, wherein the bonding power of said tackifier layer is in the range of from 400 to 800 g/25 mm and its tack is 4 or below.

10. A hologram calendar according to claim 1, wherein said hologram formation layer consists of a layer on which an image by a diffraction grating is formed.

* * * * *